(12) United States Patent
Kuang et al.

(10) Patent No.: US 7,117,964 B1
(45) Date of Patent: Oct. 10, 2006

(54) CONTROL SYSTEM FOR A HYBRID ELECTRIC VEHICLE POWERTRAIN

(75) Inventors: Ming Lang Kuang, Canton, MI (US); Fazal U. Syed, Canton, MI (US); David Smith, Knoxville, TN (US); Shailesh S. Kozarekar, Novi, MI (US); Vincent Freyermuth, Ypsilanti, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 185 days.

(21) Appl. No.: 10/605,309

(22) Filed: Sep. 22, 2003

(51) Int. Cl.
*H02J 7/14* (2006.01)

(52) U.S. Cl. .............. 180/65.3; 180/65.4; 320/104; 701/22; 903/943

(58) Field of Classification Search .......... 180/65.2, 180/65.3, 65.4, 65.6, 65.7, 65.8; 701/22; 320/104, 132
See application file for complete search history.

(56) References Cited

U.S. PATENT DOCUMENTS

| 4,427,934 | A | | 1/1984 | Tupper |
| 5,713,814 | A | * | 2/1998 | Hara et al. ................ 477/5 |
| 5,722,502 | A | * | 3/1998 | Kubo ................... 180/65.4 |
| 5,842,534 | A | * | 12/1998 | Frank .................. 180/65.2 |
| 5,951,614 | A | * | 9/1999 | Tabata et al. ............ 701/54 |
| 6,122,588 | A | * | 9/2000 | Shehan et al. ........... 701/93 |
| 6,215,198 | B1 | | 4/2001 | Inada et al. |
| 6,301,529 | B1 | | 10/2001 | Itoyama et al. |
| 6,328,671 | B1 | | 12/2001 | Nakajima et al. |
| 6,364,807 | B1 | * | 4/2002 | Koneda et al. ............ 477/5 |
| 6,600,980 | B1 | * | 7/2003 | Kraska et al. ........... 701/22 |
| 6,907,325 | B1 | * | 6/2005 | Syed et al. ............. 701/22 |
| 2004/0168840 | A1 | * | 9/2004 | Kuang et al. .......... 180/65.2 |

* cited by examiner

*Primary Examiner*—Jeff Restifo
(74) *Attorney, Agent, or Firm*—David B. Kelley; Brooks & Kushman

(57) ABSTRACT

A control system for a hybrid powertrain for a hybrid electric vehicle with an internal combustion engine and an electric drive system including an electric motor, a battery and a generator. The control system includes a system controller that monitors actual battery power in a closed-loop fashion and detects an error between actual battery power and a request for battery power. The engine power is corrected so that the battery is used at its intended level, thereby avoiding unnecessary charging and discharging.

19 Claims, 7 Drawing Sheets

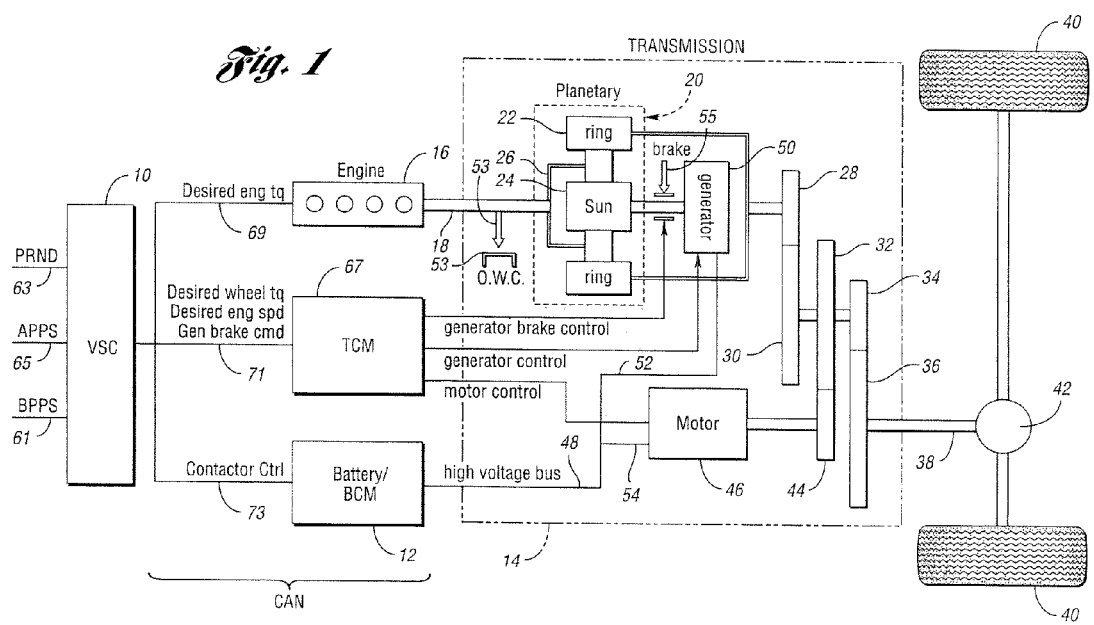

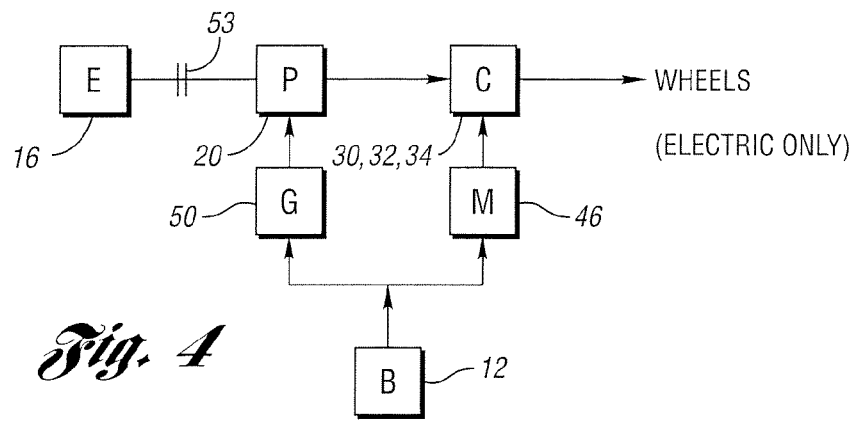
*Fig. 4* (ELECTRIC ONLY)
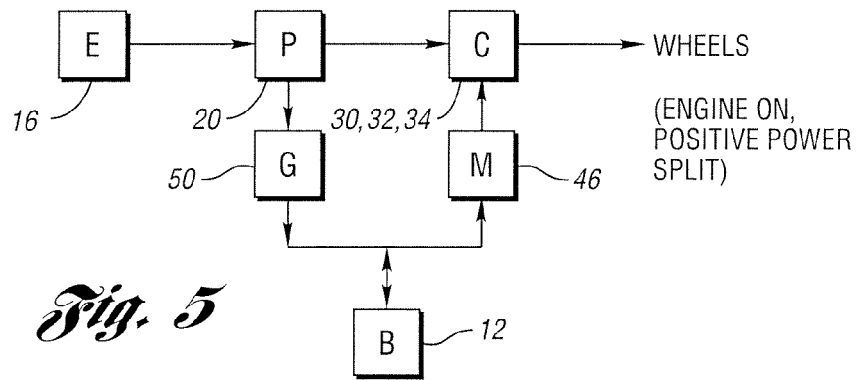
*Fig. 5* (ENGINE ON, POSITIVE POWER SPLIT)
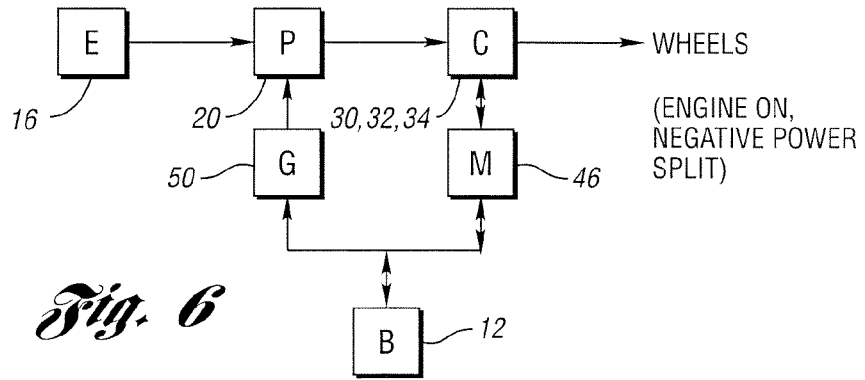
*Fig. 6* (ENGINE ON, NEGATIVE POWER SPLIT)
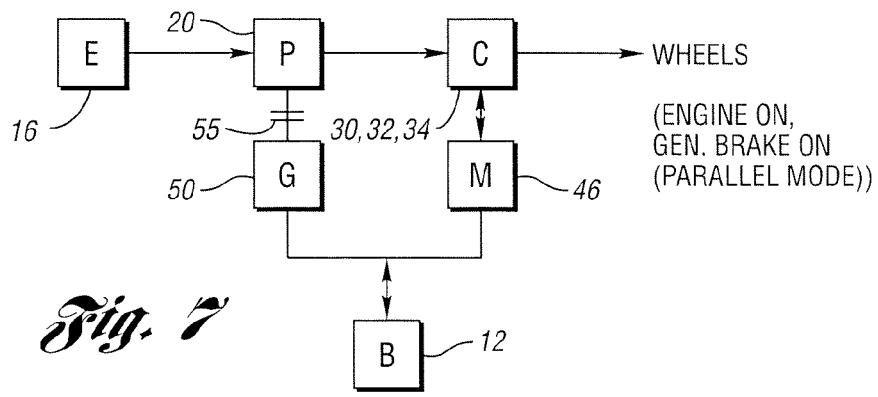
*Fig. 7* (ENGINE ON, GEN. BRAKE ON (PARALLEL MODE))

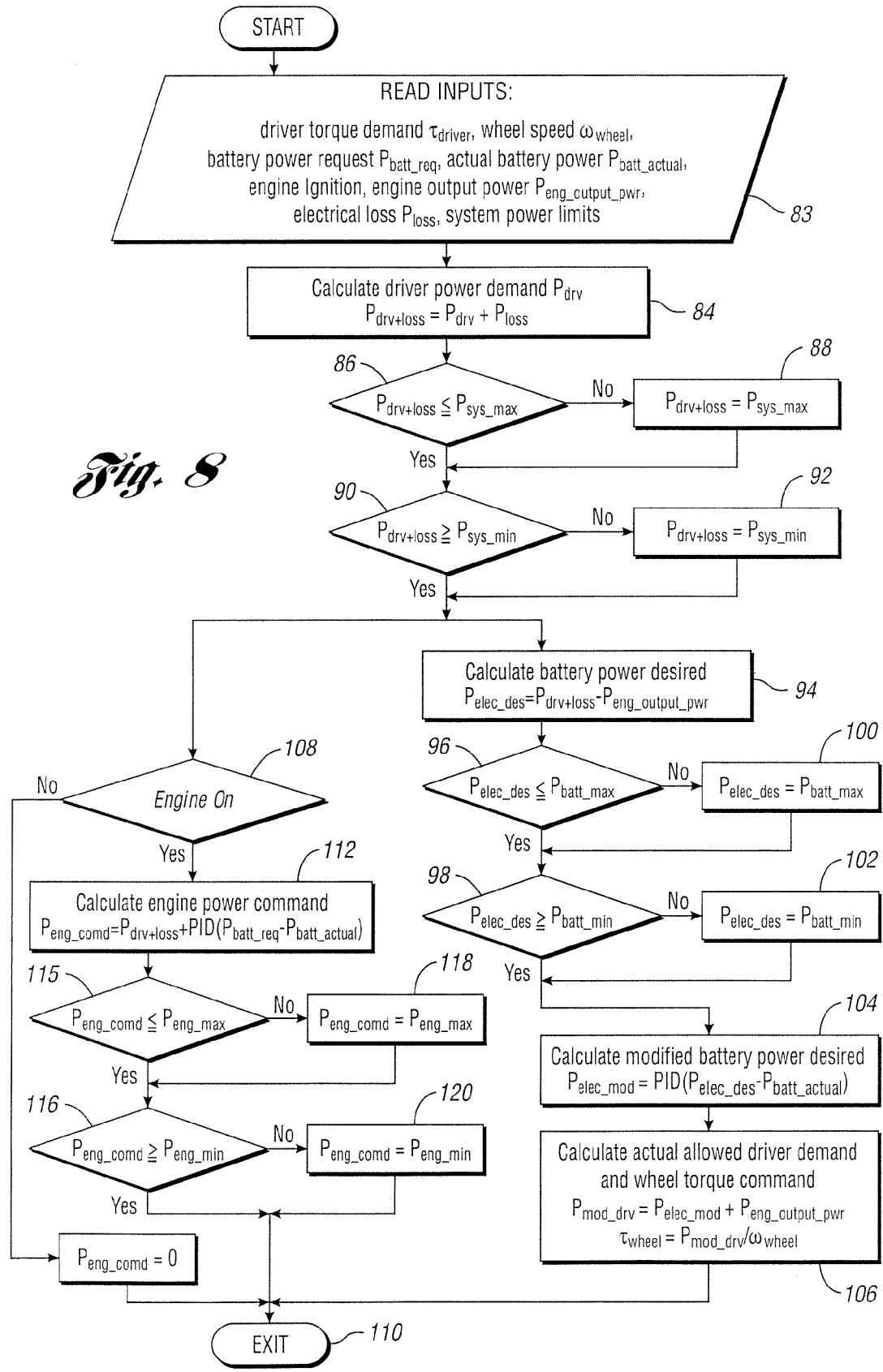

CONTROL SYSTEM FOR A HYBRID ELECTRIC VEHICLE POWERTRAIN

CROSS REFERENCE TO RELATED APPLICATIONS

This application relates to U.S. patent application Ser. No. 10/248,886, filed Feb. 27, 2003, entitled "Closed-Loop Power Control System for Hybrid Electric Vehicles", now issued as U.S. Pat. No. 6,991,053, which is assigned to the assignee of this application.

BACKGROUND OF INVENTION

1. Field of the Invention

The invention relates to a control system for a hybrid electric vehicle powertrain having an engine and an electric motor with either a parallel or a series power flow path.

2. Background Art

Powertrains for known hybrid electric vehicles include an internal combustion engine, which functions as a first power source, and a high voltage induction motor with a battery, which function as a second power source. The power sources may be part of a powertrain with parallel power flow paths or a series power flow path. In parallel hybrid powertrains, an engine, a motor, a generator and a battery, together with gearing, define a first power delivery configuration. A second power delivery configuration comprises only the motor, the generator and the battery, together with gearing.

The generator in a parallel hybrid powertrain is driven by the engine in a first mechanical power flow path that is established between the engine and the transmission torque output shaft. A second power flow path is an electrical power flow path, which distributes power from the engine to the generator, the latter driving the torque output shaft through the gearing. With the generator and the motor operating in this configuration, they together establish a continuously variable ratio, electromechanical transmission system.

A fully mechanical power flow path can be established by braking the generator as engine power is transmitted with a fixed gear ratio through the gearing.

A hybrid powertrain with a series power flow path includes an engine mechanically connected to a generator, an electric motor electrically coupled to the generator, and torque output gearing mechanically connected to the motor.

A powertrain comprising the present invention has features that are common to the features of the hybrid electric vehicle powertrain disclosed in the co-pending patent application identified above, which is assigned to the Assignee of the present invention. Reference may be made to that co-pending application for the purpose of supplementing this disclosure. The disclosure of the co-pending application is incorporated in this disclosure by reference.

SUMMARY OF INVENTION

One embodiment of a powertrain that includes the present invention has an internal combustion engine power source and a motor-generator with a battery power source. The engine and the battery function together seamlessly as torque is delivered through a gear system to vehicle traction wheels. The performance limits of the battery subsystem are not exceeded as the driver's demand for power is met by the two power sources acting together. Total powertrain efficiency is optimized without sacrificing powertrain performance.

Another embodiment of a powertrain for a hybrid electric vehicle that includes the present invention is a so-called series hybrid powertrain, which has a generator connected directly to an engine and an electric motor connected directly to the torque input side of a transmission, the traction wheels being connected drivably to the torque output side of the transmission. The battery acts as an energy storage medium for the generator, which is coupled to the motor.

The control system for the present invention prevents the battery limits from being exceeded, either during discharge or during charging. This is accomplished by coordinating the control functions in a closed-loop fashion as power is delivered to the vehicle traction wheels from the two power sources in response to a driver demand for power.

The power demand may involve a battery power request wherein the battery is charged or discharged. The driver's demand for power takes into account the engine characteristic torque and speed relationship. Preferably, a torque and speed relationship is established at a point that will achieve maximum powertrain efficiency. The driver's demand for torque also takes into account generator and motor losses.

An actual hybrid electric vehicle powertrain, when in operation, is subject to environmental factors and manufacturing variables that affect performance and efficiency. Because of this, there will be differences between the actual engine characteristics and the engine characteristics determined by a vehicle system controller. There are also differences between the actual losses during operation and the static losses for the generator and the motor. These differences may result in a vehicle system controller command that requests insufficient power from the engine during transient operating periods, which in turn would require the battery to compensate for a shortcoming in the power available from the engine. It also may result in commands that result in excess power from the engine, which in turn would result in unnecessary charging of the battery. Regardless of whether the battery is charged or discharged at levels higher than intended, battery life would be adversely affected.

The present invention makes it possible to provide for battery power feedback that will correct engine power during operation thereby keeping battery usage within the intended battery operating range. This will avoid significant degradation of battery life.

In the control system of the previously identified copending application, a vehicle system controller determines engine power based on the driver's demand and a battery power request. This assumes that noise factors such as part-to-part manufacturing variations and environmental factors do not affect the relationship between wheel torque and engine torque. The present invention will protect the battery from excessive charging or discharging by using a battery feedback control loop to correct for variations that occur because of such noise factors. The control system includes a transmission control module that estimates engine generated power based upon a driver demand for power. The estimated engine generated power, if it is not matched to total wheel power required, is supplemented by battery power as determined by a vehicle system controller. The battery power supplies the deficiency in the engine power thereby meeting the total wheel power demand.

The total system loss can be varied because of several noise factors caused by part-to-part variations and environmental factors. The commanded power then may not include the needed battery power or the engine may not deliver the requested engine power. Since the engine power shortfall is supplied by the battery, noise factors result in battery usage that differs from that which is commanded by the vehicle system controller. The controller then changes the operation of the powertrain based upon the current battery state of charge. The battery usage thus is increased and battery life is decreased. This condition is prevented by the present invention.

In the system of the present invention the closed-loop control system calculates an error between the battery power request and the actual battery power. The controller then adjusts the real battery power request in accordance with an energy management strategy, which changes the engine power request accordingly. The result of this is that the actual battery power is the same as a battery power request. In this way the closed-loop system of the invention minimizes unnecessary battery usage due to part-to-part manufacturing variations and varying environmental factors.

BRIEF DESCRIPTION OF DRAWINGS

FIG. 1 is a schematic representation of one embodiment of a hybrid electric vehicle powertrain incorporation of the invention, which includes a controller network, a generator, an electric motor and planetary gearing, which establish split-power flow paths to the traction wheels of the vehicle;

FIG. 4 is a schematic block diagram of a hybrid electric vehicle powertrain wherein the motor and the battery act as a sole power source;

FIG. 5 is a schematic block diagram, similar to the diagram of FIG. 4, wherein the engine is operating with a positive power split;

FIG. 6 is a schematic block diagram, similar to FIG. 4, wherein the engine is on and the power flow has a negative power split;

FIG. 7 is a schematic block diagram, similar to FIG. 4, wherein the engine is on and the generator brake is on, thereby establishing a parallel power flow mode;

FIG. 8 is a flow diagram illustrating the software steps for carrying out the control functions shown in FIG. 3;

DETAILED DESCRIPTION

Figure 1A:
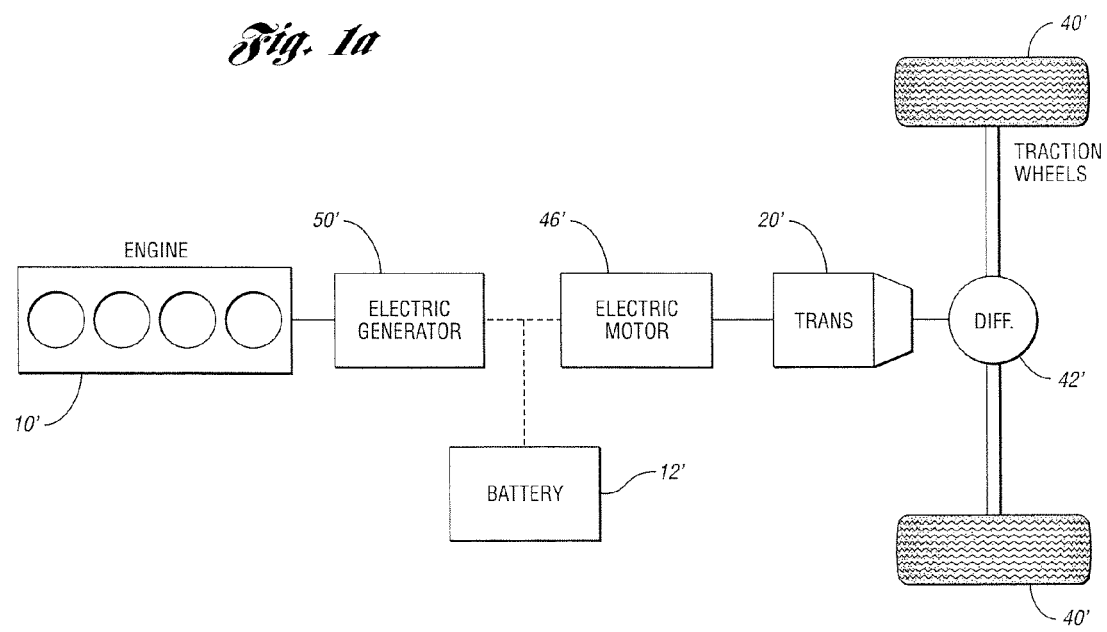
FIG. 1a is a schematic representation of another embodiment of a hybrid electric vehicle powertrain incorporating the invention, which includes an engine, a generator and a motor arranged in a series power flow path.

Throughout the description, reference will be made from time-to-time to the terms "negative battery power request" and "positive battery power request." Assuming that there is a battery power request for charging, that request will be considered to be a request for negative power. If the battery power request is for discharging the battery, that request will be considered to be a request for positive power.

The hybrid electric vehicle powertrain of the embodiment of the invention shown in FIG. 1 has a parallel, power-split configuration. A vehicle system controller 10, a battery 12 and a transaxle 14, together with a motor-generator subsystem, comprise a control area network (CAN). An engine 16, controlled by controller 10, distributes power through power input shaft 18 to transmission 14.

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34 and 36. A power output shaft 38 for the transaxle is drivably connected to vehicle traction wheels 40 through a differential-and-axle mechanism 42.

Gears 30, 32 and 34 are mounted on a countershaft, the gear 32 engaging a motor-driven gear 44. Electric motor 46 drives gear 44, which acts as a torque input for the countershaft gearing.

The battery delivers electric power to the motor through power flow path 48. Generator 50 is connected electrically to the battery and to the motor in known fashion, as shown at 52.

When the powertrain battery 12 is acting as a sole power source with the engine off, the power input shaft 18 and the carrier assembly are braked by an overrunning coupling 53. A mechanical brake 55 anchors the rotor of generator 50 and the sun gear 24 when the engine is on and the powertrain is in a parallel, fully mechanical drive mode, the sun gear 24 acting as a reaction element.

In FIG. 1, the vehicle system controller 10 receives a signal from a transmission range selector 63, which is distributed to transmission control module 67, together with a desired wheel torque signal, a desired engine speed signal and a generator brake command, as shown at 71. A battery contactor or switch 73 is closed after vehicle "key-on" startup. The controller 10 issues a desired engine torque request to engine 16, as shown at 69, which is dependent on accelerator pedal position sensor output 65.

A brake pedal position sensor distributes a wheel brake signal to controller, as shown at 61. The transmission control module issues a generator brake control signal to generator brake 55. It also distributes a generator control signal to generator 50.

As mentioned previously, there are two power sources for the driveline. The first power source is a combination of the engine and generator subsystems, which are connected together using the planetary gear unit 20. The other power source involves only the electric drive system including the motor, the generator and the battery, where the battery acts as an energy storage medium for the generator and the motor.

The driveline configuration of FIG. 1a is a series hybrid powertrain having the same basic elements as the parallel powertrain of FIG. 1. Those basic elements are identified by the same numerals used in FIG. 1, although prime notations are added to the numerals used in FIG. 1a.

The powertrain of FIG. 1a has an engine 10 which is coupled directly to generator 50'. A battery 12' serves as an electrical storage medium for generator 50', the battery being coupled electrically to motor 46'. The rotor of motor 46' is connected directly to the power input side of transmission 20'. The power output side of the transmission is connected drivably to the traction wheels 40' through geared differential 42'.

Figure 2:
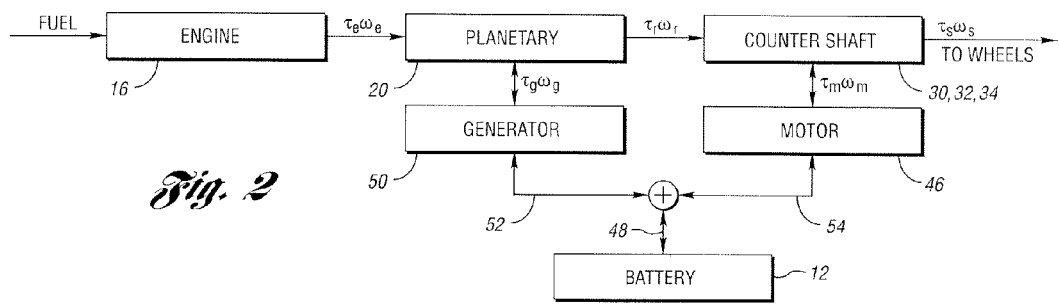
FIG. 2 is a schematic block diagram of a system power flow diagram corresponding to the powertrain of FIG. 1.

The power flow paths between the various elements of the powertrain diagram shown in FIG. 1 is illustrated in FIG. 2. Fuel is delivered to the engine 16 under the control of the operator in known fashion using an engine throttle. Engine power delivered to the planetary gear unit 20 is expressed as $T_e\omega_e$, where $T_e$ is engine torque and $\omega_e$ is engine speed. Power delivered from the planetary ring gear to the countershaft gears is expressed as $T_r\omega_r$, which is the product of ring gear torque and ring gear speed, respectively. Power out from the transmission 14 is represented by the symbols $T_s$ and $\omega_s$, the torque of shaft 38 and the speed of shaft 38, respectively.

The generator, when it is acting as a motor, can deliver power to the planetary gearing. Alternatively, it can be driven by the planetary gearing, as represented in FIG. 2 by the power flow path 52. Similarly, power distribution between the motor and the countershaft gears can be distributed in either direction, as shown by the power flow path 54. Driving power from the battery or charging power to the battery is represented by the bi-directional arrow 48.

As shown in FIG. 2, engine output power can be split into two paths by controlling the generator speed. The mechanical power flow path, $T_r\omega_r$, is from the engine to the carrier to the ring gear to the countershaft. The electrical power flow path is from the engine to the generator to the motor to the countershaft. The engine power is split, whereby the engine speed is disassociated from the vehicle speed during a so-called positive split mode of operation. This condition is illustrated in FIG. 5, where the engine 16 delivers power to the planetary gearing 20, which delivers power to the countershaft gears 30, 32 and 34, which in turn drive the wheels. A portion of the planetary gearing power is distributed to the generator 50, which delivers charging power to the battery 12. The speed of the generator is greater than zero or positive, and the generator torque is less than zero. The battery drives the motor 46, which distributes power to the countershaft. This arrangement is a positive split.

If the generator, due to the mechanical properties of the planetary gear unit, acts as a power input to the planetary gear unit to drive the vehicle, the operating mode can be referred to as a negative split. This condition is shown in FIG. 6, where the generator speed is negative and the generator torque also is negative.

The generator in FIG. 6 delivers power to the planetary gear unit 20 as the motor 46 acts as a generator and the battery 12 is charging. It is possible, however, that under some conditions the motor may distribute power to the countershaft gearing if the resulting torque at the wheels from the gearing does not satisfy the driver demand. Then the motor must make up the difference.

If the generator brake 55 is activated, a parallel operating mode is established. This is shown in FIG. 7, where the engine 16 is on and the generator is braked. The battery 12 powers the motor 46, which powers the countershaft gearing simultaneously with delivery of power from the engine to the planetary gearing to the countershaft gearing.

The first source of power can deliver power only for forward propulsion because there is no reverse gear in the countershaft gearing. The engine requires either generator control or a generator brake to permit transfer of power to the wheels for forward motion.

The second source of power, previously described, is the battery, generator and motor subsystem. This is illustrated in FIG. 4. In this driving mode, the engine is braked by overrunning coupling 53. The electric motor draws power from the battery and effects propulsion independently of the engine, with either forward or reverse motion. The generator may draw power from the battery and drive against reaction torque of one-way coupling 53. The generator in this mode operates as a motor.

Figure 3:
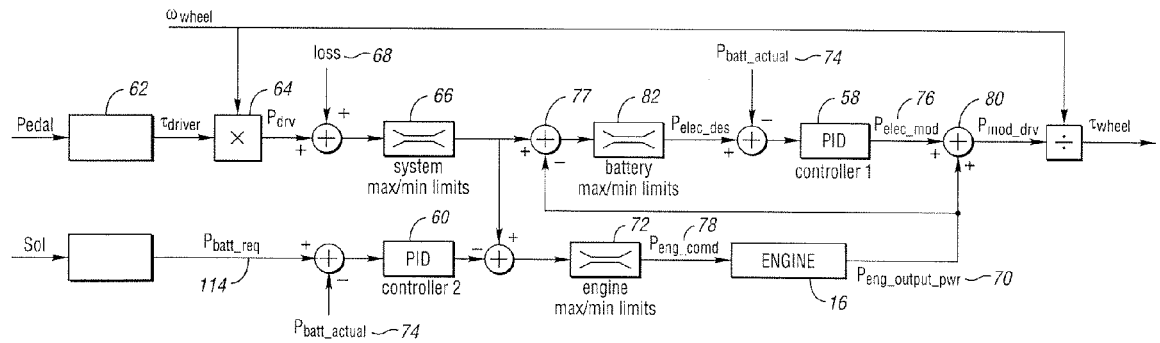
FIG. 3 is a schematic block diagram of a closed-loop power control system for the invention.

As previously indicated, the two power sources are integrated so that they seamlessly work together to meet the driver's demand for power without exceeding the system's power limits, including battery limits, while maintaining optimum powertrain efficiency and performance. The system will determine the driver's demand for power and achieve the optimum split of power between the two power sources. If the battery limits are exceeded and the battery voltage is outside of a specified range, powertrain system shutdown may occur. In order to avoid this condition without limiting the maximum vehicle performance, the present invention coordinates the two power sources using a closed-loop power control. A schematic representation of the closed-loop power control is shown in FIG. 3. This ensures a proper coordination between the two power sources.

FIG. 3 is a block diagram for the closed-loop powertrain control system for the embodiment shown in FIG. 1 as well as the embodiment of FIG. 1a. It properly distributes total power request, which is the sum of the driver demand and the battery discharge and charge power request to the two power sources.

FIG. 3 includes a first controller 58, which is a closed-loop PID controller that prevents actual battery power from exceeding defined limits. A second PID controller 60 ensures that the battery is being charged or discharged accordingly by adjusting the engine power command.

The control system shown in FIG. 3 calculates the driver power demand ($P_{drv}$) based on the driver torque demand, $T_{driver}$, and wheel speed $\omega_{wheel}$. The driver torque demand is derived from accelerator pedal position using transducer 62. The wheel speed is obtained by a wheel speed sensor. The product of the wheel speed and the driver torque demand determines the driver power demand $P_{drv}$, as shown at 64.

Losses, $P_{loss}$, are electrical powertrain losses, which comprise motor losses and gearing losses (i.e., $P_{loss}=P_{motor}$ ($t_{motor}$, $\omega_{motor}$)). After the electrical losses are accounted for at 68 and the maximum system limits are determined at 66 and the actual engine output power is determined at 70, the control system determines the battery power desired ($P_{elec\_des}$) that is within the battery limits. The engine power command ($P_{eng\_comd}$) is tested at 72 to determine whether it is within engine capability.

The actual battery power ($P_{batt\_actual}$) at 74 is used as a feedback for controller 58 to ensure, by determining modified battery power desired ($P_{elec\_mod}$) as shown at 76, that the actual battery power satisfies battery power desired ($P_{elec\_des}$). Therefore, the actual battery power does not exceed battery limits.

The control system algebraically adds the values $P_{elec\_mod}$ and $P_{eng\_output\_power}$ to determine the allowed driver demand $P_{mod\_drv}$. This sum will ensure that the maximum system capability is achieved without violating battery limits.

The control system calculates wheel torque command $T_{wheel}$ $$\left[\left(T_{wheel} = \frac{P_{mod} - drv}{\omega_{wheel}}\right)\right]$$

$$\left[\left(T_{wheel} = \frac{P_{mod} - drv}{\omega_{wheel}}\right)\right]$$

which is the driver torque command as limited to the system limits.

The second PID controller 60 (shown in FIG. 3), as explained previously, adjusts the engine power command $P_{eng\_comd}$ to ensure that the battery power request $P_{batt\_req}$ for an optimal energy management strategy is achieved.

The first controller 58 may have a faster response than the second controller 60 to ensure control system stability.

If it is assumed, for example, that in a steady-state operating mode a driver requests 50 kw of power, after accounting for the electrical losses at 68, and the engine power output at 70 is 50 kw, the battery power desired ($P_{elect\_des}$) will be zero. The battery power desired ($P_{elect\_des}$) is the difference between the value at comparator 66 and the engine output power at 70. Depending upon whether the electrical loss estimate is equal to the actual electrical loss, it is possible within steady-state operating conditions, that the output of controller 58 will be zero. This would cause the power at summing point 80 in FIG. 3 to be 50 kw.

If, for example, the driver requests a change from a power level of 50 kw to a power level of 70 kw after accounting for electrical losses, and the engine limit is 50 kw, the battery will be called upon to supply 20 kw. If actual battery power 74 is close to the battery power demand as limited by the comparator at 82, the value for $P_{elec\_mod}$ will be equal to or less than 20 kw. The two values are summed at 80 to produce the desired wheel torque $T_{wheel}$.

If the actual battery power 74 exceeds the battery power demand permitted by the comparator 82, the value for $P_{elec\_mod}$ will be reduced at comparator 82 so that the value for $P_{mod\_drv}$ will be smaller, thereby ensuring that the battery power optimal energy management strategy is satisfied.

The software strategy for implementing the closed-loop power control of FIG. 3 is shown in FIG. 8. At the beginning of the control routine, the various input signals are read, which include a driver torque command, the wheel speed, the battery power request, the actual battery power engine ignition, engine output power, electrical loss and system power limits. Monitoring these input values occurs at step 83 in FIG. 8. Having received the input values, the driver power demand is calculated at 84. It then is determined at 86 whether the driver demand for power, plus the electrical losses, is less than or equal to the system maximum limit. If that power demand is not less than or equal to the system maximum limit, the driver power demand is set at 88 to a value equal to the maximum system limits.

If the inquiry at 86 is positive, a similar test is made at step 90, where it is determined whether the driver demand for power, plus the electrical losses, is greater than the minimum value established at 66. If the inquiry is negative, the prior demand for power, plus the electrical loss, is set at 92 to a value equal to the system minimum limits. If the inquiry is positive, the routine will calculate the electrical power desired, as shown at 94.

The magnitude of the electrical power desired is equal to the difference between the driver demand for power and the engine output power, as shown at 94. If the electrical power desired is less than or equal to the maximum battery power permitted by the comparator 82, as shown at 96 in FIG. 8, the routine will proceed to step 98, where it is determined whether the electrical power desired is greater than or equal to the battery power minimum limit. As in the case of the steps shown at 88 and 92, the electrical power desired is set at the battery maximum or minimum limits at 100 or 102, respectively, if the inquiry at either 96 or 98 is negative.

If the inquiries at 96 and 98 are positive, the modified battery power desired $P_{elect\_mod}$ is calculated by the energy management control module, as shown at 104. The value for $P_{mod\_drv}$ is equal to the sum of the values determined at 70 and 76 in FIG. 3. Torque at the wheels is equal to $P_{mod\_drv}$÷wheel speed, as shown at 106.

The control routine for the second controller 60 and the comparator 72 begins by determining whether the engine is on or off, as shown at 108. This occurs simultaneously and parallel to the sub-routine beginning at 94 in FIG. 8. If the engine is off, the routine will exit, as shown at 110. If the engine is on, the engine power command is calculated, as shown at 112. The second controller 60 receives at 115 the algebraic sum of the values for the requested battery power at 114 in FIG. 3 and the actual battery power 74. If the calculated value for commanded engine power is less than or equal to the maximum engine power limit, as determined at 115, the routine will proceed to test the minimum engine power limit for engine commanded power at 116. The calculations for engine commanded power at 118 and 120 are similar to the calculations that occur at steps 88 and 92 and at steps 100 and 102.

As seen from the foregoing description, the engine power is determined by the driver's demand for power and by the battery power request while taking the engine static torque and speed characteristic and the generator and motor losses into consideration. If there is a difference between the actual engine characteristics and the engine characteristic used for engine power determination at the vehicle system controller, that difference may be due to part-to-part variations or other factors, such as environmental factors. Under these conditions, the vehicle system controller may command insufficient power from the engine, which would result in a battery power request that is unnecessarily high. On the other hand, if the vehicle system controller commands too much power as a result of a transient reduction in engine output torque, for example, the battery would be charged unnecessarily.

Regardless of whether the battery is being discharged or charged as a result of environmental or transient influences, the battery usage is higher than the intended usage and the battery life is adversely affected.

Figure 9:
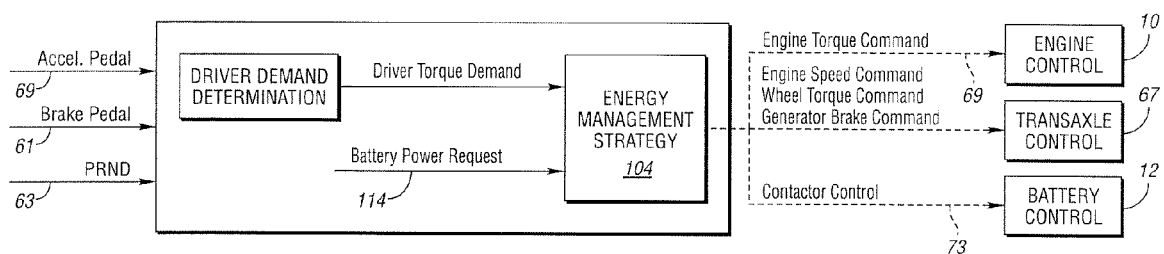
FIG. 9 is a block diagram of a hybrid electric vehicle powertrain controller without a battery power feedback control loop.

FIG. 9 shows an open loop control that does not distinguish between the actual battery power and the battery power request. A driver torque demand, which is based upon the accelerator pedal position at 69, is transferred to the energy management strategy module generally identified in FIG. 9 at 104, which controls an engine torque command for the controller 10. The transaxle control 67 receives an engine speed command, a wheel torque command, and a generator brake command from the energy management strategy module at 104.

Figure 10:
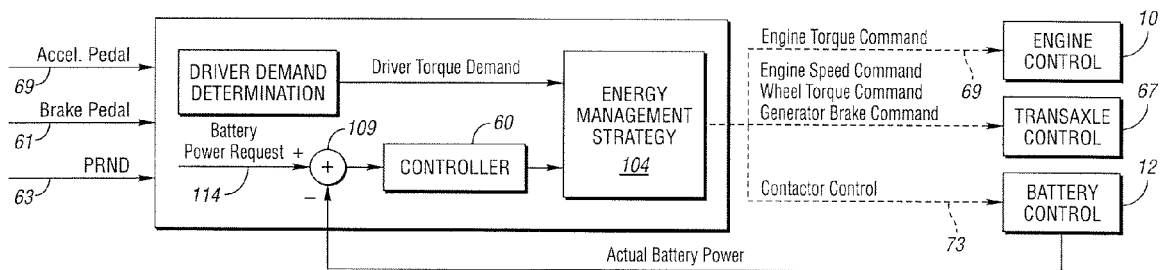
FIG. 10 is a block diagram similar to FIG. 9, but which includes a battery power feedback control loop.
Figure 12:
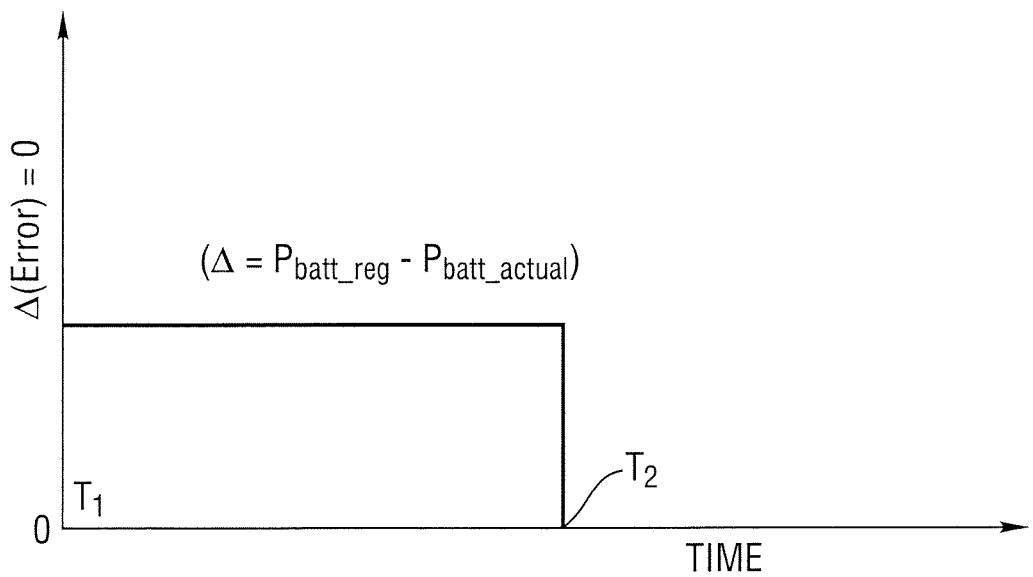
FIG. 12 is a time plot of an error between requested battery power and actual battery power.

In the case of the present invention, the block diagram of FIG. 9 is augmented to include controller 60 and an actual battery power feedback, as shown at 107 in FIG. 10. If there is a difference between the actual battery power and the battery power request, that difference is measured at summing point 109 in FIG. 10 and is indicated as an error, shown in FIG. 12 as a value "Δ. In FIG. 12, the error may begin at time $T_1$=0 and end, for example, at time T2.

The error Δ is transferred to the vehicle system controller 10, and an engine power adjustment is calculated in accordance with the algorithm:

$$Y = K_p \times \Delta + K_i \int \Delta dt.$$

Figure 11:
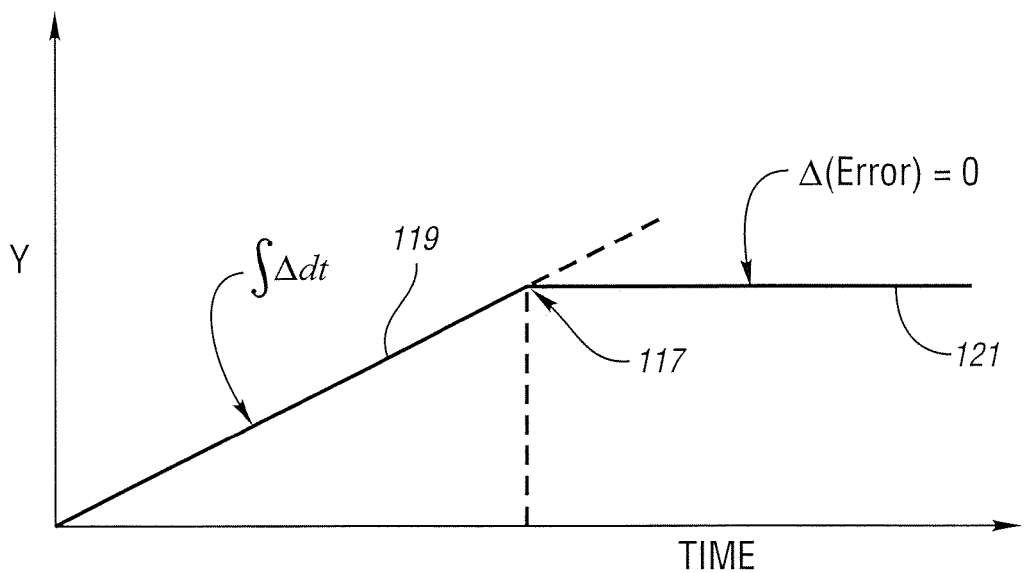
FIG. 11 is a time plot of an engine power adjustment when there is an error between a battery power request and actual battery power at the instant of a transient operating condition.

During the time interval that the error exists, the value for Y increases, as indicated in FIG. 11. The error finally reaches a zero value at 117; i.e, the slope of the plot shown at 119, which results from the engine power adjustment integration, changes to zero as shown at 121. Thereafter, the battery power request equals the actual battery power.

This power adjustment can be illustrated in the following examples. In a first example, it will be assumed that the power command by the driver $P_{drv}$ at time $T_1$ is 50 kw. If the value $P_{mod\_drv}$ at 80 in FIG. 3 also is 50 kw, there is no need to issue a battery power request, so the value $P_{batt\_req}$ is zero. The engine power command $P_{eng\_com}$ under these circumstances is 50 kw plus $P_{loss}$. In this example, it will be assumed that the power loss is 10 kw. Thus, the total engine power command would be 60 kw. The engine power output at 70 in FIG. 3, at time $t_1$ then would be 60 kw. The battery then is neither being charged nor discharged.

If, at a later instant at time $t_2$, the engine power command should increase to 70 kw rather than remaining at 60 kw, the battery power request would be 10 kw, assuming that the driver command for power at 64 in FIG. 3 remains at 50 kw. Thus, at time $T_2$ the engine power output $P_{engine\_output\_pow}$ is 70 kw, the battery power is 10 kw and the battery is in a charging state. This results in an additional load on the engine. The output power $P_{mod\_drv}$ at 80 in FIG. 3 thus remains at 50 kw.

If it is assumed that at a later instant $t_2$ the engine power output should drop from 70 kw, for some reason such as environmental variations, to a value of 65 kw, the battery will be charged at a lower rate because then there will be an error Δ. The value Δ is the difference between the battery power request and the actual battery power. Again, an engine power adjustment is made in accordance with the algorithm shown in FIG. 11. The battery charge then is −5 kw. It thus is seen that a change in engine power will not result in overcharging the battery.

In a second example, it will be assumed that the system is operating at time $t_1$ with a driver demand for power of 50 kw. As in a previous example, the battery power request again is zero. A power loss, as in a previous example is 10 kw, so the engine power command $P_{eng\_com}$ is 60 kw. The engine output power is 60 kw and the value for $P_{mod\_drv}$ at 80 is 50 kw.

If it now is assumed that at a later instant $t_2$ the engine power output drops to 50 kw, the battery will be called upon to supply 10 kw, which causes the battery to be discharged. The value for $P_{mod\_drv}$ is still 50 kw, but there is a difference of 10 kw between the battery power request and the actual battery output. The algorithm of FIG. 11 again is called upon to reduce the error until at time $t_2$ the error becomes zero, as shown at 117 in FIG. 11. The engine command was increased to 70 kw before the integration of FIG. 11 takes place. Following the integration, the error Δ becomes zero, so the engine power output can be returned at $t_2$ to 60 kw. As in the first example, the value for $P_{mod\_drv}$ remains at 50 kw while the transient condition exists.

Although embodiments of the invention have been described, it will be apparent to those skilled in the art that modifications may be made without departing from the scope of the invention. All such modifications and equivalents thereof are intended to be covered by the following claims.

The invention claimed is:

1. A method for controlling a hybrid powertrain for an automotive vehicle having a driver-controlled engine, an electric motor, a battery, a generator connected to the battery and a gear system, the power train establishing a split-power flow path for distributing power to vehicle traction wheels, the battery defining an electric power source, and the engine defining a mechanical power source, the method comprising the steps of:
   delivering engine torque to a first torque input element of the gear system, delivering reaction torque of the gear system to the generator and delivering torque from a torque output element of the gear system to the traction wheels thereby establishing a power-split in a first power delivery configuration;
   delivering torque from the electric power source through the gear system to the traction wheels with the engine deactivated thereby establishing a second power source configuration;
   coordinating power delivery from the mechanical and electrical power sources whereby a response to driver demand for power will optimize driveline efficiency and performance without exceeding power limits for the engine and the battery;
   the step of coordinating power delivery from the electric power source and the mechanical power source including the steps of establishing a request for battery power and a request for engine power, controlling actual battery power during an operating interval using a closed-loop feedback, and determining an error between the actual battery power and a requested battery power; and
   adjusting a battery power request during transient and steady-state operating conditions to change the request for engine power whereby the error becomes zero, the closed-loop feedback thereby minimizing unnecessary battery usage due to variable operating conditions.

2. The method set forth in claim 1 including the step of braking the generator to establish a parallel mechanical torque flow path to the traction wheels with a fixed gear system ratio.

3. The method set forth in claim 1 including the steps of determining a driver demand for power as a function of traction wheel speed and driver torque demand;
   determining whether the driver demand for power is within predetermined engine power maximum and minimum limits; and
   delivering battery power to the transmission gearing to complement the driver demand for power when the driver demand for power is outside engine power limits.

4. The method set forth in claim 3 including the steps of determining whether a request for battery power to complement engine power is within predetermined battery power maximum and minimum limits; and
   controlling battery power to avoid exceeding battery power limits thereby preventing the battery from overcharging or over-discharging.

5. The method set forth in claim 3 wherein the step of determining driver demand for power includes the step of accounting for electrical losses in the powertrain whereby the effective demand for power is the sum of the driver demand for power and electrical power losses.

6. A method for controlling a hybrid powertrain for an automotive vehicle having an engine, an electric motor, a battery, a generator electrically coupled to the battery and a gear system, the powertrain establishing a split-power flow path for distributing power to vehicle traction wheels, the battery defining an electrical power source and the engine defining a mechanical power source, the method comprising the steps of:
   delivering engine torque to a first torque input element of the gear system, delivering reaction torque of the gear system to the generator and delivering torque from a torque output element of the gear system to the traction wheels thereby establishing split-power delivery;

coordinating power delivery from the engine and the battery whereby a response to driver demand for power will optimize efficiency and performance without exceeding power limits for the engine and the battery;

the step of coordinating power deliver from the engine and the battery including the steps of establishing a request for battery power and a request for engine power, controlling actual battery power during an operating interval using a closed-loop feedback, determining an error between the actual battery power and a requested battery power; and adjusting a battery power request during transient and steady-state operating conditions to change the request for engine power whereby the error becomes zero, the closed loop feedback thereby minimizing unnecessary battery usage due to variable operating conditions.

7. The method set forth in claim 6 including the steps of determining a driver demand for power as a function of traction wheel speed and driver torque demand; determining whether the driver demand for power is within predetermined engine power maximum and minimum limits; and delivering battery power to the transmission gearing to complement the driver demand for power when the driver demand for power is outside engine power limits.

8. The method set forth in claim 7 including the steps of determining whether a request for battery power to complement engine power is within predetermined battery power maximum and minimum limits; and controlling battery power to avoid exceeding battery power limits thereby preventing the battery from overcharging or over-discharging.

9. The method set forth in claim 7 wherein the step of determining driver demand for power includes the step of accounting for electrical losses in the powertrain whereby the effective demand for power is the sum of the driver demand for power and electrical power losses.

10. A closed-loop power control system for a powertrain for a hybrid electric vehicle comprising:

an engine defining in part a mechanical drive system, a battery, a motor and a generator defining in part an electric drive system, a planetary gear unit having a sun gear, a ring gear and a planetary carrier, the engine being connected to the carrier and the sun gear being connected to the generator;

a geared torque flow path defined by the electric drive system and the mechanical drive system extending to vehicle traction wheels, a torque input element of the electric drive system being connected to the motor and a torque input element of the mechanical drive system being connected to the engine;

a first controller for coordinating power distribution from the engine and the battery to effect optimal powertrain performance within predefined battery power charging and discharging limits;

a second controller for receiving a request for battery power; and a closed-loop feedback system for controlling actual battery power during an operating interval and determining an error between the actual battery power and a requested battery power;

the second controller being connected to the closed-loop feedback system and including a software algorithm for adjusting a battery power request during transient and steady-state operation to change the request for engine power whereby the error becomes zero, thus minimizing unnecessary battery usage due to transient operating conditions.

11. The control system set forth in claim 10 including a vehicle system controller, the vehicle system controller comprising means for limiting power distribution to the traction wheels, following a driver demand for power, to power values within predefined power maximum and minimum system limits.

12. The control system set forth in claim 11 including a vehicle system controller, the vehicle system controller comprises means for incrementing the driver demand for power by an amount equal to electrical power losses in the driveline whereby the incremented driver demand for power is limited to the predefined maximum and minimum system limits.

13. A method for controlling a hybrid powertrain for a wheeled automotive vehicle having a driver-controlled engine, an electric motor, a battery, a generator connected to the battery and a gear system, the battery defining an electric power source and the engine defining a mechanical power source, the method comprising the steps of:

coordinating power delivery from the mechanical and electrical power delivery from the mechanical and electrical power sources whereby a response to driver demand for power will optimize driveline efficiency and performance without exceeding predefined power limits for the engine and the battery;

the step of coordinating power delivery from the electric power source and the mechanical power source including the steps of establishing a request for battery power and a request for engine power, controlling actual battery power during an operating interval using a closed-loop feedback, and determining an error between the actual battery power and a requested battery power; and adjusting a battery power request during transient and steady-state operating conditions to change the request for engine power whereby the error becomes zero, the closed-loop feedback thereby minimizing unnecessary battery usage due to variable operating conditions.

14. The method set forth in claim 13 including the steps of determining a driver demand for power as a function of vehicle wheel speed and driver torque demand;

determining whether the driver demand for power is within predetermined engine power maximum and minimum limits; and delivering battery power to the transmission gearing to complement the driver demand for power when the driver demand for power is outside engine power limits.

15. The method set forth in claim 13 including the steps of determining whether a request for battery power to complement engine power is within predetermined battery power maximum and minimum limits; and controlling battery power to avoid exceeding battery power limits thereby preventing the battery from overcharging or over-discharging.

16. The method set forth in claim 13 wherein the step of determining driver demand for power includes the step of accounting for electrical losses in the powertrain whereby the effective demand for power is the sum of the driver demand for power and electrical power losses.

17. A closed-loop power control system for a powertrain for a hybrid electric wheeled vehicle comprising:

an engine defining in part a mechanical drive system;

a battery, a motor and a generator defining in part an electric drive system;

the engine being connected drivably to the generator;

the generator being electrically coupled to the motor and the battery;

transmission gearing drivably connecting the motor to vehicle wheels whereby the engine, the generator, the motor and the transmission gearing define a series power flow configuration;

a first controller for coordinating power distribution from the engine and the battery to effect optimal powertrain performance within predefined battery charging and discharging limits;

a second controller for receiving a request for battery power; and a closed-loop feedback system for controlling actual battery power during an operating interval and determining an error between the actual battery power and a requested battery power;

the second controller being connected to the closed-loop feedback system and including a software algorithm for adjusting a battery power request during transient and steady-state operation to change the request for engine power whereby the error becomes zero, thus minimizing unnecessary battery usage due to transient operating conditions.

18. The control system set forth in claim 17 including a vehicle system controller, the vehicle system controller comprising means for limiting power distribution to the traction wheels, following a driver demand for power, to power values within predefined power maximum and minimum limits.

19. The control system set forth in claim 18 including a vehicle system controller, the vehicle system controller comprising means for incrementing a driver demand for power by an amount equal to electrical power losses in the driveline whereby the incremented driver demand for power is limited to the predefined maximum and minimum power limits.

* * * * *